United States Patent [19]

Hart

[11] Patent Number: 5,166,831
[45] Date of Patent: Nov. 24, 1992

[54] LIGHT BEAM DEFLECTING APPARATUS INCLUDING A FLUID

[75] Inventor: Edward E. Hart, Springfield, Ohio

[73] Assignee: Spectra-Physics Laserplane, Inc., Dayton, Ohio

[21] Appl. No.: 771,314

[22] Filed: Oct. 2, 1991

[51] Int. Cl.$^5$ .............................................. G02B 5/06
[52] U.S. Cl. .................................................. 359/832
[58] Field of Search .............. 359/832, 196, 290, 554, 359/665, 666

[56] References Cited

U.S. PATENT DOCUMENTS

| | | | |
|---|---|---|---|
| 2,504,039 | 4/1950 | O'Leary | 359/832 |
| 3,012,463 | 12/1961 | Krivit | 359/832 |
| 3,337,287 | 4/1967 | Lessman | 359/832 |
| 3,454,330 | 7/1969 | Smith | 359/832 |
| 3,503,663 | 3/1970 | de la Cierva et al. | 359/832 |
| 3,514,192 | 5/1970 | de la Cierva | 359/832 |
| 3,655,274 | 4/1972 | Craig | 359/832 |
| 4,293,218 | 10/1981 | Nielson et al. | |
| 4,614,405 | 9/1986 | Brandenberg et al. | 359/832 |
| 4,913,528 | 4/1990 | Hasegawa | 359/832 |
| 4,953,956 | 9/1990 | Carpenter | 359/832 |

OTHER PUBLICATIONS

"Precision Beam Deflector for Laser Alignment," Optel Instruments, Ltd.

*Primary Examiner*—Jon W. Henry
*Attorney, Agent, or Firm*—Killworth, Gottman, Hagan & Schaeff

[57] ABSTRACT

A light beam deflecting apparatus is provided for diverting a light beam from an initial path. The apparatus includes first and second substantially transparent plates. The light beam passes through the first and second plates when the first and second plates are positioned in the path of the beam of light. A connector is attached to the first and second plates for connecting the plates to one another and for permitting the plates to be displaced relative to one another. A bellows enclosure is attached to the outer edges of the first and second plates for encasing the first and second plates to form a reservoir therewith capable of supporting a fluid therein. A fluid is filled within the reservoir and causes the light beam to deviate from its initial path when the first and second plates are located in the path of the light beam and are positioned in a non-parallel position.

15 Claims, 5 Drawing Sheets

LIGHT BEAM DEFLECTING APPARATUS INCLUDING A FLUID

BACKGROUND OF THE INVENTION

The present invention relates generally to light beam deflecting apparatus for diverting a light beam from an initial path of travel and, more particularly, to such light beam deflecting apparatus which includes a fluid wedge contained within a housing for diverting the beam from its initial path as it passes therethrough.

Reference laser beams projectors which emit laser beams of light have been used in the past in numerous surveying and construction applications. For example, it is known to use a laser beam of light for alignment purposes in the construction of highways, and tunnels. However, in such applications, it is oftentimes necessary, due to curves and inclines, to either change the path of the light beam or engage in an inefficient process of dismantling and repositioning the laser beam projector at a new position.

In instances where it is desired to change the path of a light beam by only a small angle, employing means for reflecting the beam via a mirror is oftentimes impractical. One technique, however, is known for changing the path of a light beam. This technique involves employing a pair of coupled optical prisms whose relative orientation is controlled so as to deflect the light beam off-axis from its initial path into a desired path.

SUMMARY OF THE PRESENT INVENTION

The present invention relates to a light beam deflecting apparatus for diverting a light beam from an initial path of travel. The light beam deflecting apparatus includes a fluid wedge contained within a housing which serves to deflect the beam from its initial path as it passes therethrough. The deflection of the beam from its initial path is carried out by new and improved structure not previously known in the art.

In accordance with a first aspect of the present invention, a light beam deflecting apparatus is provided for diverting a light beam from an initial path. The apparatus comprises a housing having first and second transparent members which are displaceable relative to one another, and fluid means for filling the housing such that the light beam deviates from the initial path through an angle which is dependent upon the displacement of the first and second members. The light beam passes through the housing when the first and second members are positioned in the path of the beam of light.

The first and second members are preferably formed from optical glass. Furthermore, each of the first and second members preferably includes two substantially flat opposing surfaces which are substantially parallel to one another.

The housing further comprises connector means associated with the first and second members for permitting the first and second members to be displaced relative to one another. In a first embodiment, the connector means includes means for connecting the first and second members to one another at a common pivot point, and for permitting the first and second members to be displaced relative to one another about the common pivot point. In a second embodiment, the connector means includes hinge means for connecting the first and second members to one another about a common axis, and for permitting the first and second members to be displaced relative to one another about the common axis.

The housing further includes encasement means for encasing the first and second members to form a reservoir therewith capable of supporting the fluid means therein. The fluid means preferably comprises an optically clear liquid.

In accordance with a second aspect of the present invention, a light beam deflecting apparatus is provided for diverting a light beam from an initial path. The apparatus comprises: a first substantially transparent plate; a second substantially transparent plate positioned adjacent the first plate, the light beam passing through the first and second plates when the first and second plates are positioned in the path of the beam of light; connector means attached to the first and second plates for permitting the first and second plates to be displaced relative to one another; encasement means associated with the first and second plates for encasing the first and second plates to form a reservoir therewith capable of supporting a fluid therein; and, fluid means within the reservoir for causing the light beam to deviate from the initial path when the first and second plates are located in the path of the light beam and are positioned in a non-parallel position.

In a first embodiment of the present invention, the connector means comprises a pivot-point connector for connecting the first and second plates to one another at a common pivot point, and for permitting the first and second plates to be displaced relative to one another about the common pivot point. In the first embodiment, the connector means also comprises adjustment means for moving the first and second plates relative to one another about the common pivot point. In a second embodiment of the present invention, the connector means comprises hinge means for connecting the first and second plates with one another about a common axis, and for permitting the first and second plates to be displaced relative to one another about the common axis. In the second embodiment, the connector means also comprises adjustment means for moving the first and second plates relative to one another.

The encasement means preferably comprises a bellows enclosure connected to outer edges of the first and second plates. The fluid means may comprise a silicone fluid.

According to preferred embodiments, it is an object of the present invention to provide a light beam deflecting apparatus for diverting a light beam from an initial path of travel. It is a further object of the present invention to provide a light beam deflecting apparatus which employs a fluid wedge contained within a housing for deflecting the beam from its initial path as it passes therethrough. These and other objects and advantages of the invention will be apparent from the following description, the accompanying drawings, and the appended claims.

DETAILED DESCRIPTION OF THE INVENTION

Figure 1:
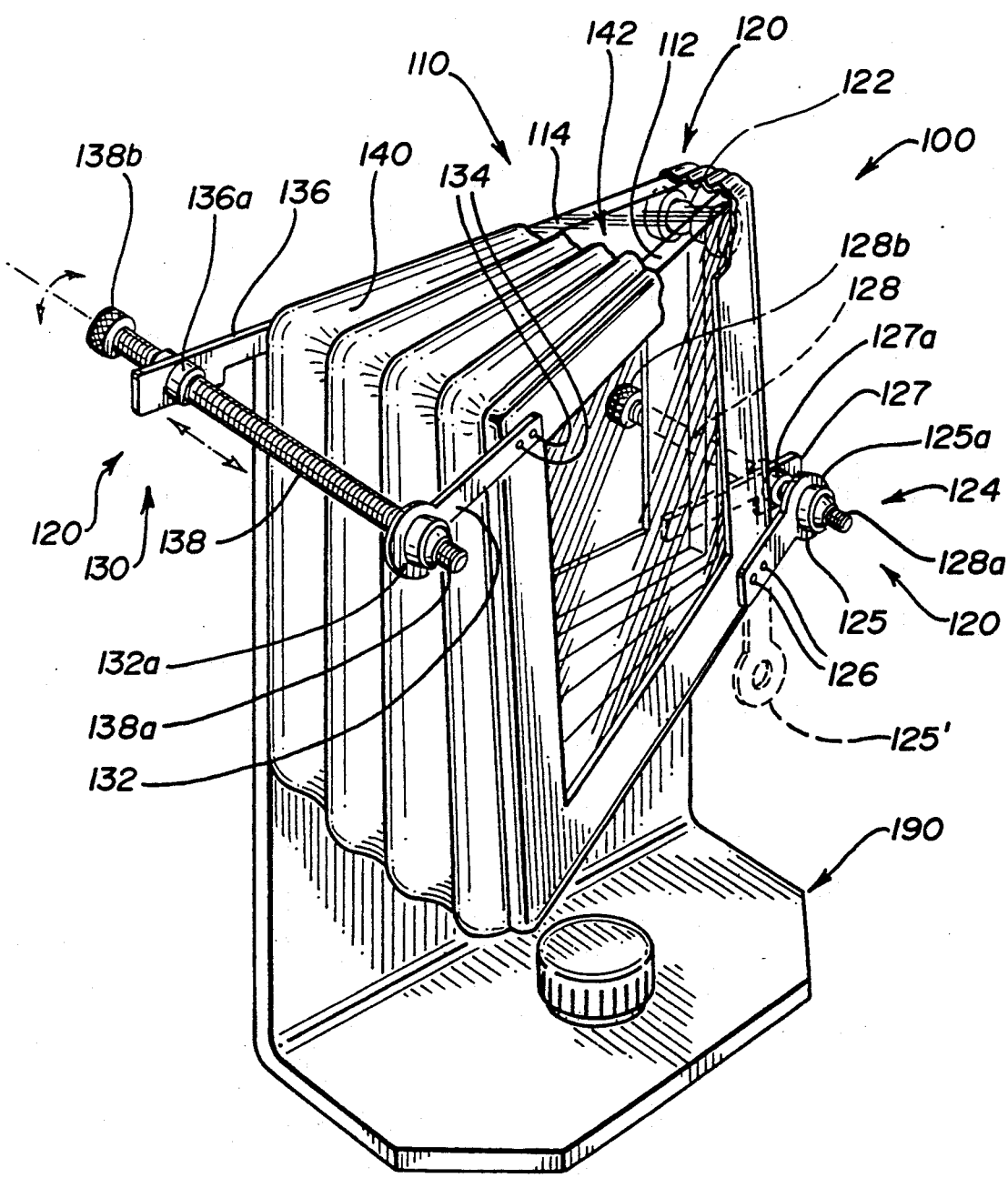
FIG. 1 is a perspective view of a beam deviator constructed in accordance with the first embodiment of the present invention with the bellows enclosure partially broken away.

A first embodiment of a light beam deflecting apparatus of the present invention is illustrated in FIG. 1, and is designated by the reference numeral 100. The beam deflecting apparatus 100 includes a housing 110 mounted upon a support arrangement 190 which, in turn, may be mounted upon a tripod (not shown).

Figure 3:
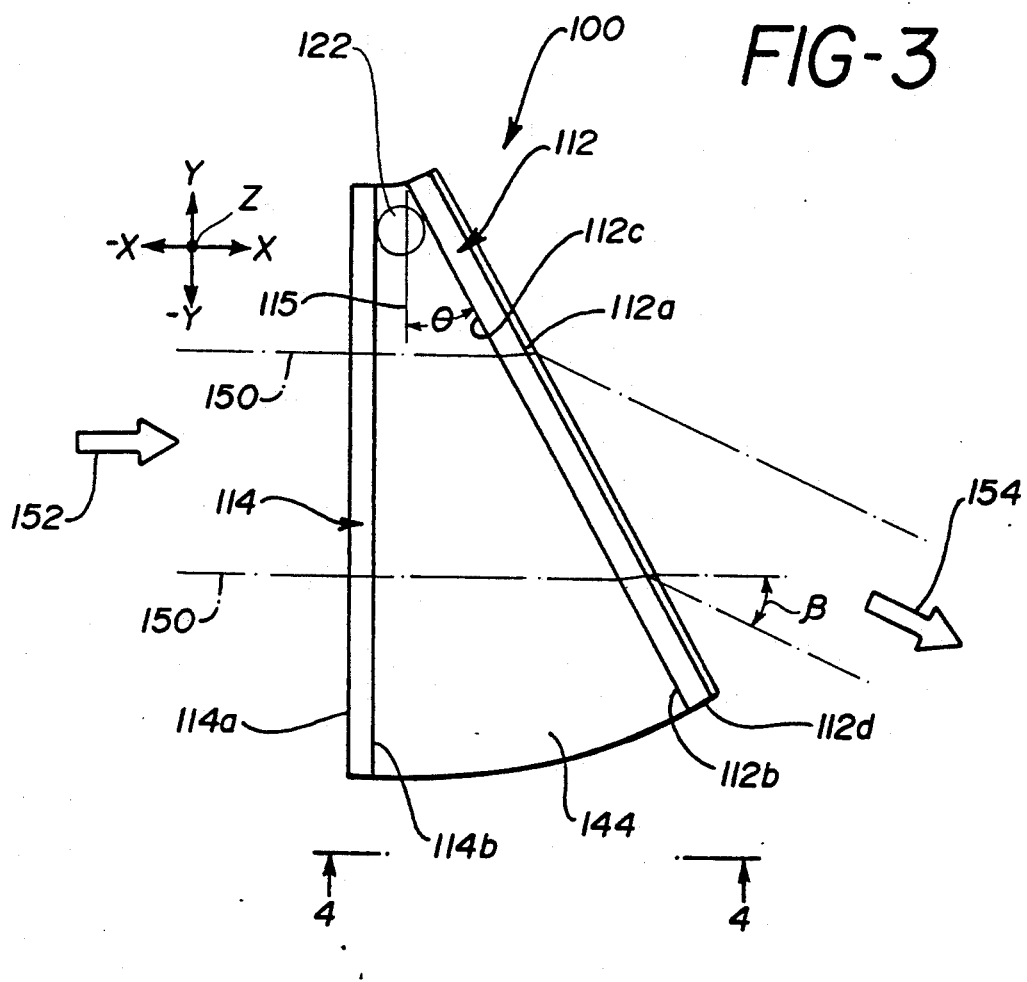
FIG. 3 is a top plan view of the first embodiment of the beam deviator of the present invention taken generally along line 3—3 in FIG. 2.
Figure 4:
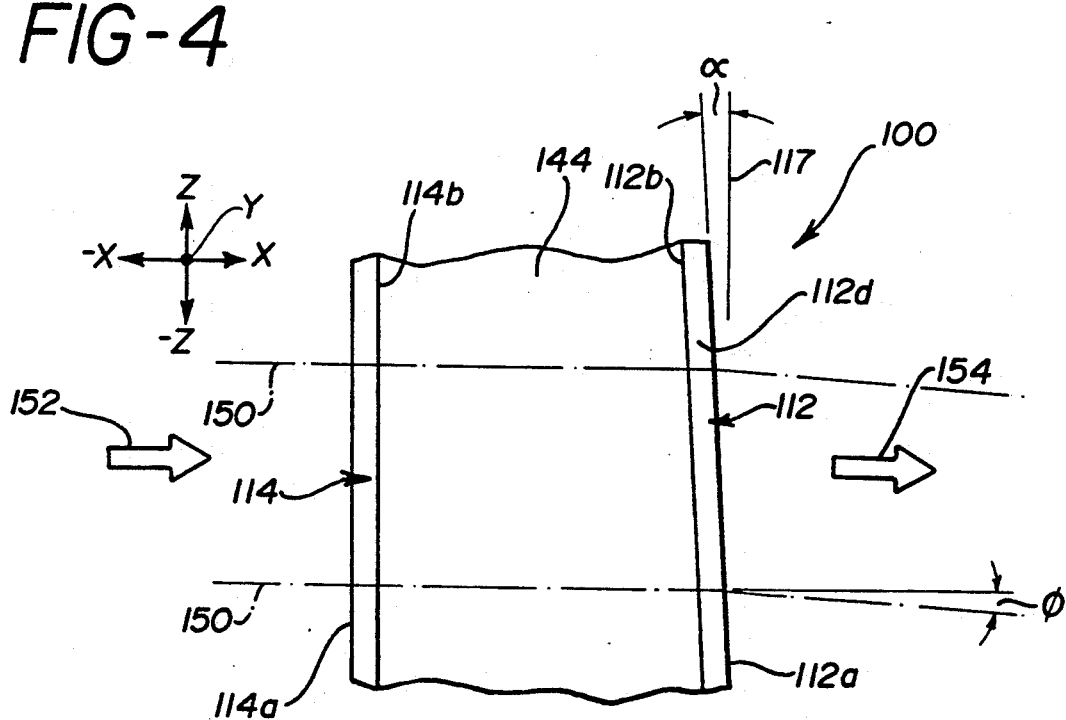
FIG. 4 is a frontal view of the first embodiment of the beam deviator of the present invention taken generally along line 4—4 in FIG. 3.

The housing 110 comprises first and second substantially transparent plates 112 and 114, respectively, which are preferably formed from optical glass. Other materials may also be used when forming the plates 112 and 114, including polymeric materials. Plate 112, as best shown in FIGS. 3 and 4, includes first and second substantially flat opposing surfaces 112a and 112b, respectively, which are substantially parallel to one another. Plate 114 likewise includes first and second substantially flat opposing surfaces 114a and 114b, respectively, which are substantially parallel to one another.

Referring again to FIG. 1, the housing 100 further includes connector means 120 attached to the first and second plates 112 and 114 for attaching the plates 112 and 114 to one another and for permitting the plates 112 and 114 to be displaced relative to one another. The connector means 120 includes a pivot-point connector 122 for connecting the first and second plates 112 and 114 to one another. As will be discussed in greater detail below, the pivot-point connector 122 allows the first and second plates 112 and 114 to be displace relative to one another from a parallel position to a non-parallel position.

The connector means 120 further comprises first and second adjustment means 124 and 130, respectively, which allow an operator to move the two plates 112 and 114 relative to one another about the pivot-point connector 122. The first adjustment means 124 includes a first arm 125 which is fixedly mounted to the first plate 112 by fasteners 126, and a second arm 127 which is fixedly mounted to the second plate 114 by fasteners (not shown). A bolt 128 is provided and is rotatably connected at its first end 128a to a distal end 125a of the first arm 125 for movement with the first arm 125. The bolt 128 also passes through and threadedly engages with a threaded portion 127a of the second arm 127. A knurled knob 128b is provided on a second end of the bolt 128 and serves to allow an operator, upon rotation of the knob 128b in either a clockwise or counterclockwise direction, to move the first plate 112 relative to the second plate 114.

The second adjustment means 130 includes a third arm 132 which is fixedly mounted to the first plate 112 by fasteners 134, and a fourth arm 136 which is fixedly mounted to the second plate 114 by fasteners (not shown). A bolt 138 is provided and is rotatably connected at its first end 138a to the distal end 132a of the third arm 132 for movement with the third arm 132. The bolt 138 also passes through and threadedly engages with a threaded portion 136a of the fourth arm 136. A knurled knob 138b is provided on the second end of the bolt 138 and serves to allow an operator, upon rotation of the knob 138b in either a clockwise or counter-clockwise direction, to further move the first plate 112 relative to the second plate 114.

The housing 100 additionally includes a bellows enclosure 140 (also referred to herein as encasement means) which is positioned about and connected to the outer edges of the first and second plates 112 and 114. The bellows enclosure 140 encases the first and second plates 112 and 114 and forms a reservoir 142 therewith capable of supporting a fluid therein. A fluid 144, having an index of refraction that differs from that of air, is placed within the reservoir 142, and serves to divert a beam of light away from its initial path. The fluid 144 preferably comprises an optically clear silicone fluid, which is commercially available from Dow Corning Corporation under the tradename Dow Corning® fluid.

The manner in which the deflecting apparatus 100 serves to deflect a light beam away from its initial path will now be described with reference to FIGS. 2–4, which schematically illustrate the light beam deflecting apparatus 100. A light beam 150 is shown traveling along an initial path, represented by arrow 152, before entering into the deflecting apparatus 100 through the second plate 114. The first plate 112 is shown located in a non-parallel position with respect to the second plate 114. Specifically, the first plate 112 is located such that its upper, inner edge 112c is positioned in an X-Y plane at an angle $\theta$ from a line 115 defining the initial position of the upper, inner edge 112c when the first plate 112 is located parallel to the second plate 114 (see FIG. 3). Further, the frontal, outer edge 112d of the first plate 112 is positioned in an X-Z plane at an angle $\alpha$ with respect to vertical 117, defined by the second plate 114 (see FIG. 4).

As shown in FIGS. 3 and 4, the beam 150 enters both the second plate 114 and the fluid 144 at an angle substantially normal thereto resulting in the beam 150 passing through the second plate 114 and into the fluid 144 substantially undeflected. However, as the beam 150 leaves the fluid 144 and passes from the first plate 112, it is refracted such that it travels along a second path, represented by arrow 154. Specifically, the beam 150 is refracted by an angle $\beta$ in the X-Y plane, as shown in FIG. 3, and by an angle $\phi$ in the X-Z plane, as shown in FIGS. 2 and 4.

Figure 2:
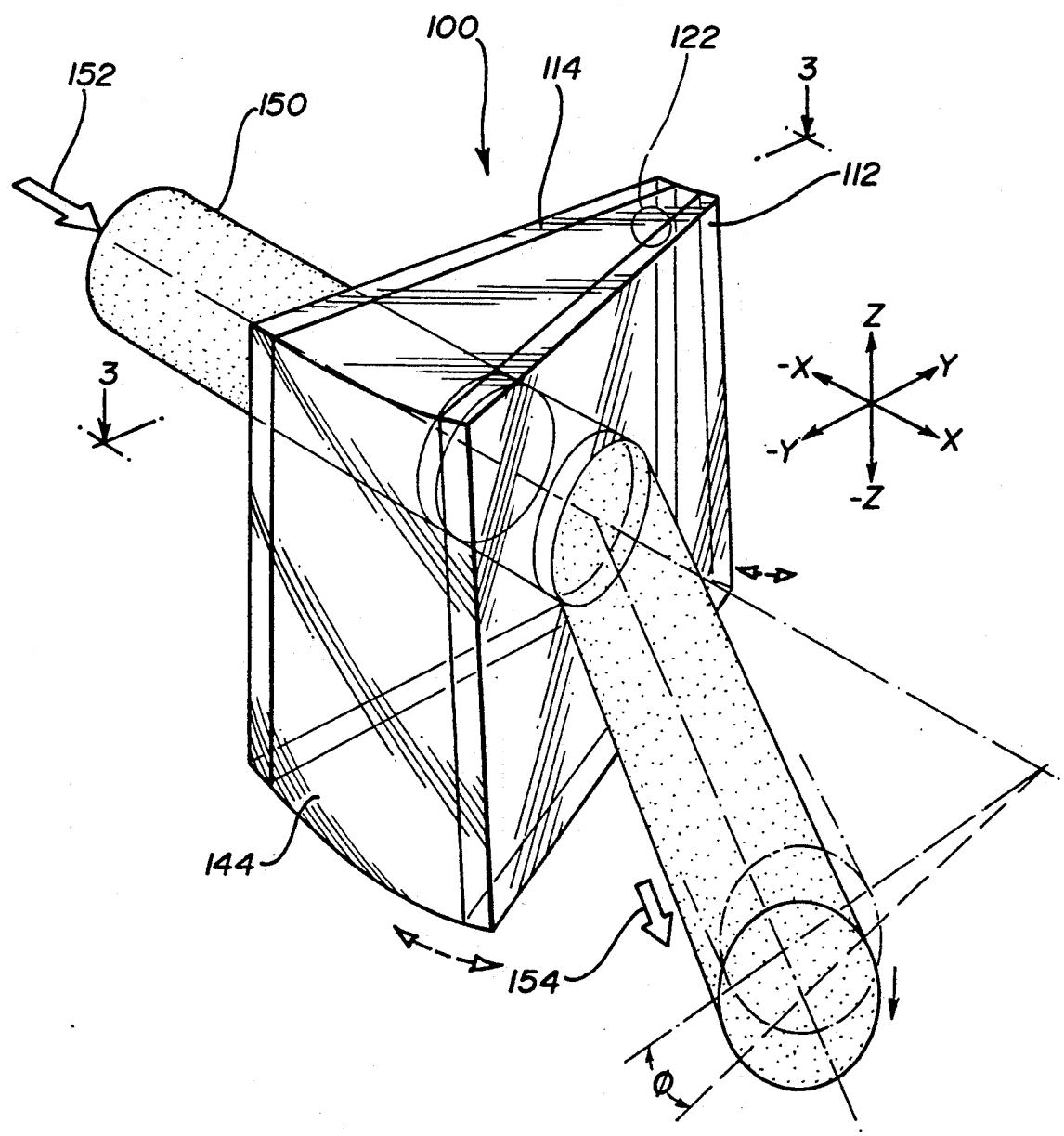
FIG. 2 is a schematic perspective view of a beam deviator constructed in accordance with the first embodiment of the present invention.

In FIGS. 2–4, the illustrated position of the first plate 112 relative to the second plate 114 was chosen for exemplary purposes only. It should be apparent, that the position of the first plate 112 relative to the second plate 114 may be varied by adjusting bolts 128 and 138 so as to change the direction of the beam 150 in a desired manner.

Figure 5:
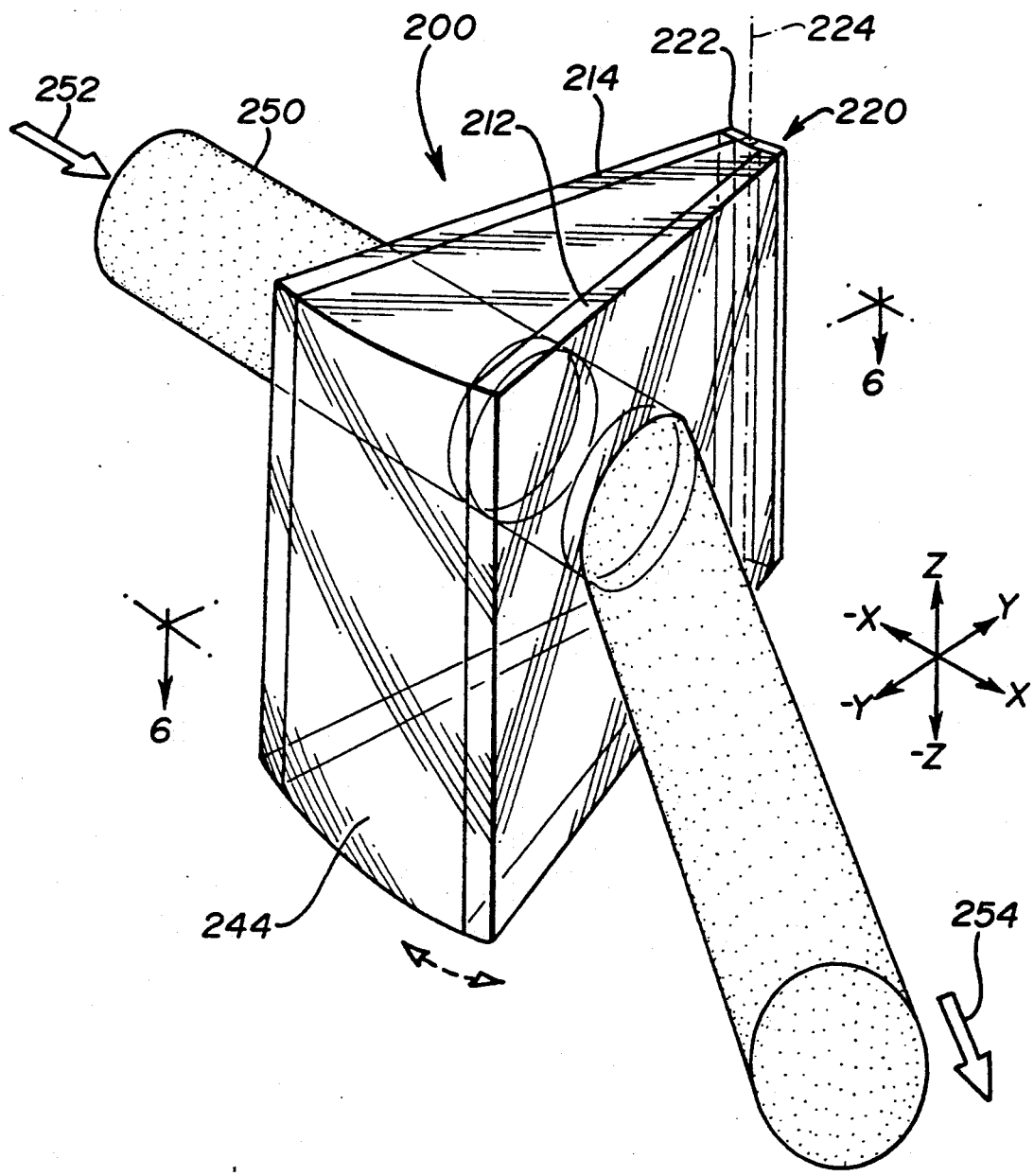
FIG. 5 is a schematic perspective view of a beam deviator constructed in accordance with the second embodiment of the present invention.
Figure 6:
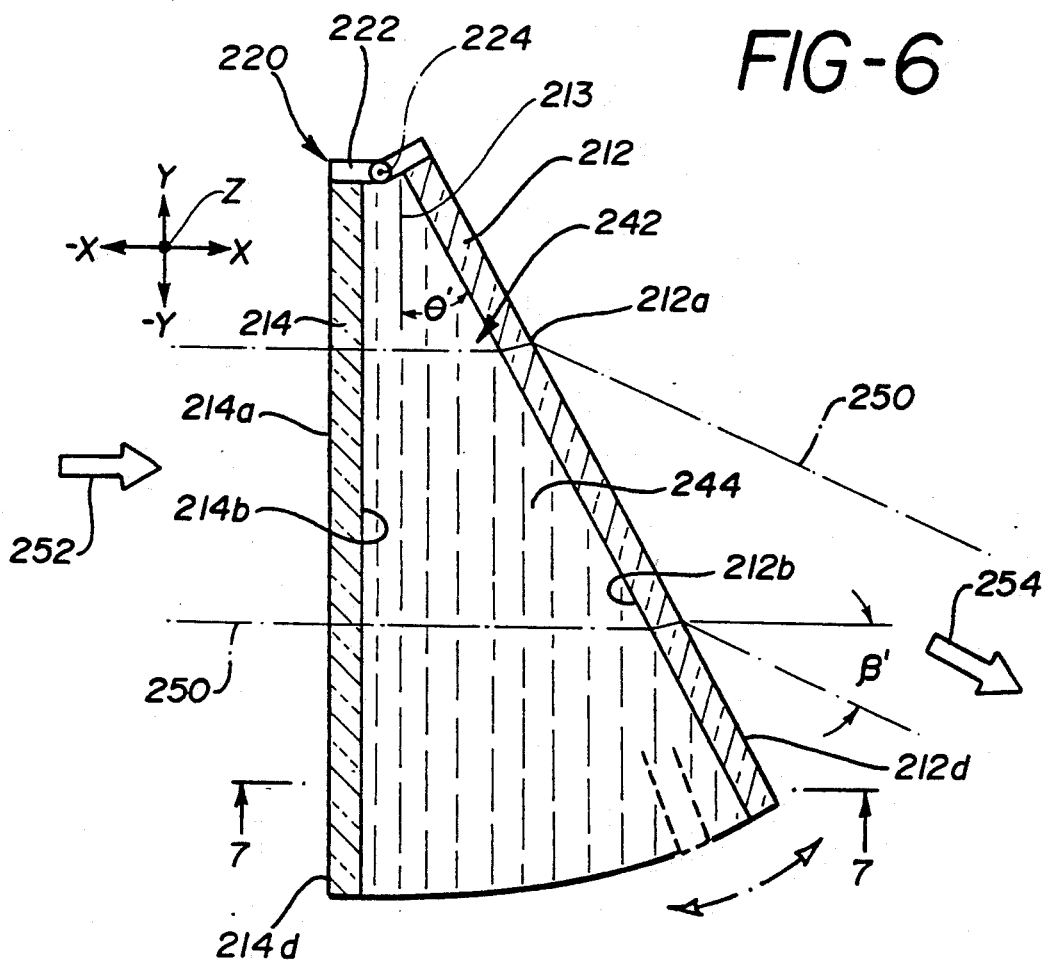
FIG. 6 is a cross-sectional view taken generally along section line 6—6 in FIG. 5; and, FIG. 7 is a cross-sectional view taken generally along section line 7—7 in FIG. 6.
Figure 7:
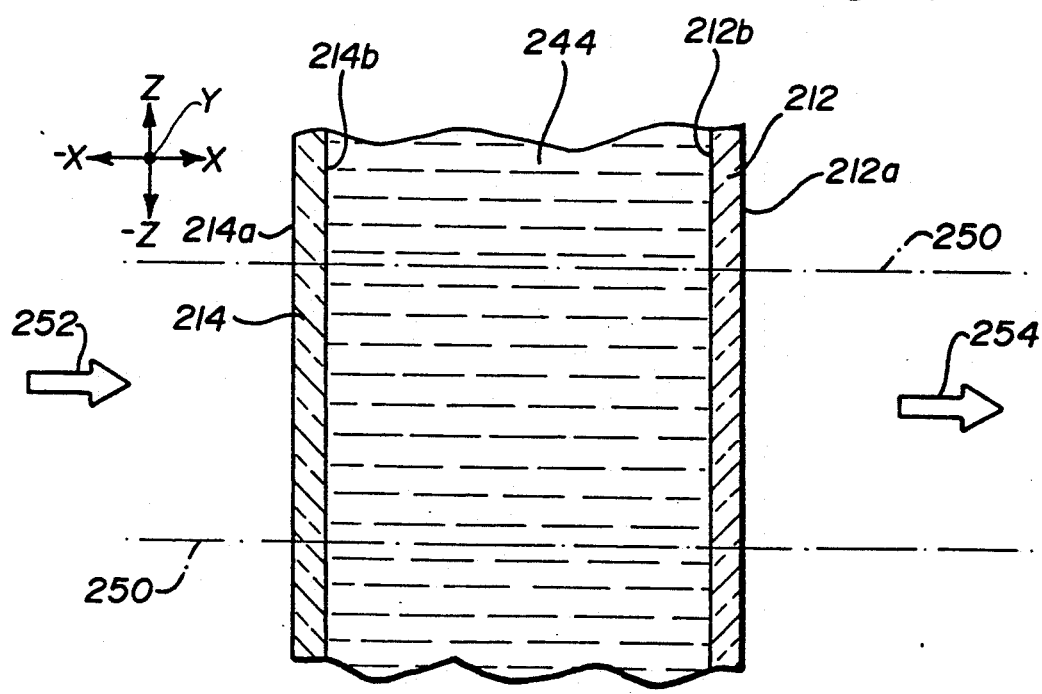

A second embodiment of a light beam deflecting apparatus of the present invention, generally designated by the reference numeral 200, is schematically shown in FIGS. 5–7. The light beam deflecting apparatus 200 is substantially similar to the light beam deflecting apparatus 100 shown in FIGS. 1–4, except for the connector means 220.

In the second deflecting apparatus 200, the connector means 220 includes a hinge connector 222 for connecting the first and second plates 212 and 214 to one another about a common axis 224. The connector means 220 also comprises at least one adjustment means (not shown) connected to frontal, outer portions 212d and 214d of the first and second plates 212 and 214. The adjustment means is constructed and connected to the first and second plates 212 and 214 in substantially the same manner that the adjustment means 130 is connected to the first and second plates 112 and 114 of the first deflecting apparatus 100, as set forth above.

The light beam deflecting apparatus 200 further comprises a bellows enclosure (not shown) which is positioned about and connected to the outer edges of the first and second plates 212 and 214 in the same manner that the bellows enclosure 140 is connected to the plates 112 and 114 of the first beam deflecting apparatus 100. The bellows enclosure serves to encase the first and second plates 212 and 214 to form a reservoir 242 therewith capable of supporting a fluid therein. A fluid 244, having an index of refraction that differs from that of air, is placed within the reservoir 242, and serves to divert a light beam away from its initial path.

A light beam 250 is shown in FIGS. 5-7 traveling along an initial path, represented by arrow 252, before entering into the deflecting apparatus 200 through the second plate 214. The first plate 212 is shown located in a non-parallel position with respect to the second plate 214. Specifically, the first plate 212 is located such that its inner surface 212b is positioned in an X-Y plane at an angle $\theta'$ from a line 213 defining the initial position of the inner surface 212b when the first plate 212 is located parallel to the second plate 214 (see FIG. 3). Further, the outer and inner surfaces 212a and 212b of the plate 212 and the outer and inner surfaces 214a and 214b of the plate 214 are each located in a separate vertical plane (see FIG. 7).

As shown in FIGS. 6 and 7, the beam 250 enters both the second plate 214 and the fluid 244 at an angle substantially normal thereto resulting in the beam 25 passing through the second plate 214 and into the fluid 244 substantially undeflected. However, as the beam 250 leaves the fluid 244 and passes from the first plate 212, it is refracted such that it travels along a second path, represented by arrow 254. Specifically, the beam 250 is refracted by an angle $\beta'$ in the X-Y plane, as shown in FIG. 6, yet is not refracted out of the X-Y plane, as shown in FIG. 7.

By employing the present invention, an operator can deflect a beam away from its initial path through an angle which is dependent upon the movement of the first and second plates of the light beam deflecting apparatus. Specifically, by employing the first embodiment of the present invention, an operator can deflect a beam both horizontally and vertically as desired so as to deflect the beam from its initial path of travel. By employing the second embodiment of the present invention, an operator can change the direction of beam within a horizontal plane without diverting the beam out of the horizontal plane.

Having described the invention in detail and by reference to preferred embodiments thereof, it will be apparent that modifications and variations are possible without departing from the scope of the invention defined in the appended claims. For instance, in the light deflecting apparatus 100, the first and second arms 125 and 127 may be rotated downwardly 90° (only arm 125 is shown rotated in FIG. 1 as arm 125') so as to be in vertical alignment with pivot point 122 to permit the first and second plates to be pivoted about a vertical axis passing through pivot point 122 and bolt 128. This would permit the beam 150 to be adjustable within a horizontal plane.

What is claimed is:

1. A light beam deflecting apparatus for diverting a light beam from an initial path, said apparatus comprising:
   a housing having first and second transparent members which are displaceable relative to one another, said light beam passing through said housing when said first and second members are positioned in the path of said beam of light;
   fluid means for filling said housing such that said light beam deviates from said initial path when said first and second members are displaced relative to one another; and
   said housing further comprising connector means associated with said first and second members for connecting said first and second members to one another so that said first and second members are displaceable relative to one another, said connector means including means for connecting said first and second members at a common pivot point positioned between said first and second members so that said first and second members are displaceable relative to one another about said common pivot point to allow said light beam to be refracted by a first angle in a first plane and by a second angle in a second plane which is substantially orthogonal to said first plane.

2. A light beam deflecting apparatus as set forth in claim 1, wherein each of said first and second members include two substantially flat opposing surfaces which are substantially parallel to one another.

3. A light beam deflecting apparatus as set forth in claim 1, wherein said first and second members are formed from optical glass.

4. A light beam deflecting apparatus as set forth in claim 1, wherein said first and second members are formed from a polymeric material.

5. A light beam deflecting apparatus as set forth in claim 1, wherein said housing further includes encasement means associated with said first and second member for encasing said first and second members to form a reservoir therewith capable of supporting said fluid means therein.

6. A light beam deflecting apparatus as set forth in claim 1, wherein said fluid means comprises an optically clear liquid.

7. A light beam deflecting apparatus as set forth in claim 1, wherein said fluid means comprises a silicone fluid.

8. A light beam deflecting apparatus for diverting a light beam from an initial path, said apparatus comprising:
   a first substantially transparent plate;
   a second substantially transparent plate positioned adjacent said first plate, said light beam passing through said first and second plates when said first and second plates are positioned in the path of said beam of light;
   connector means attached to said first and second plates for permitting said first and second plates to be displaced relative to one another;
   encasement means associated with said first and second plates for encasing said first and second plates to form a reservoir therewith capable of supporting a fluid therein; and fluid means within said reservoir for causing said light beam to deviate from said initial path when said first and second plates are located in said path of said light beam and are positioned in a non-parallel position, said connector means including means for connecting said first and second plates to one another at a common pivot point positioned between said first and second plates so that said first and second plates are displaceable relative to one another about said common pivot point to allow said light beam to be refracted by a first angle in a first plane and by a second angle in a second plane which is substantially orthogonal to said first plane.

9. A light beam deflecting apparatus as set forth in claim 8, wherein each of said first and second plates include two substantially flat opposing surfaces which are substantially parallel to one another.

10. A light beam deflecting apparatus as set forth in claim 8, wherein said first and second plates are formed from optical glass.

11. A light beam deflecting apparatus as set forth in claim 8, wherein said first and second plates are formed from a polymeric material.

12. A light beam deflecting apparatus as set forth in claim 8, wherein said connector means further comprises adjustment means for moving said first and second plates relative to one another about said common pivot point.

13. A light beam deflecting apparatus as set forth in claim 8, wherein said encasement means comprises a bellows enclosure connected to outer edges of said first and second plates.

14. A light beam deflecting apparatus as set forth in claim 8, wherein said fluid means comprises an optically clear liquid.

15. A light beam deflecting apparatus as set forth in claim 8, wherein said fluid means comprises a silicone fluid.

* * * * *